(12) United States Patent
Pinder et al.

(10) Patent No.: US 8,127,009 B2
(45) Date of Patent: Feb. 28, 2012

(54) RENEWABLE CONDITIONAL ACCESS

(76) Inventors: Howard G. Pinder, Norcross, GA (US);
Henry Lilly, III, Bristol, PA (US);
David A. Sedacca, Atlanta, GA (US);
Michael A. Gaul, Lawrenceville, GA (US)

( * ) Notice: Subject to any disclaimer, the term of this patent is extended or adjusted under 35 U.S.C. 154(b) by 675 days.

(21) Appl. No.: 11/427,959

(22) Filed: Jun. 30, 2006

(65) Prior Publication Data

US 2008/0005326 A1  Jan. 3, 2008

(51) Int. Cl.
*G06F 15/173* (2006.01)
(52) U.S. Cl. ......... 709/225; 725/114; 725/127; 725/141
(58) Field of Classification Search .................... 709/225
See application file for complete search history.

(56) References Cited

U.S. PATENT DOCUMENTS

| | | | |
|---|---|---|---|
| 6,246,767 B1 * | 6/2001 | Akins et al. .................... | 380/210 |
| 6,516,412 B2 * | 2/2003 | Wasilewski et al. .......... | 713/168 |
| 6,560,340 B1 * | 5/2003 | Akins et al. .................... | 380/239 |
| 6,744,892 B2 * | 6/2004 | Akins et al. .................... | 380/241 |
| 2004/0117817 A1 | 6/2004 | Kwon | |
| 2004/0181811 A1 * | 9/2004 | Rakib ............................ | 725/122 |
| 2005/0155069 A1 | 7/2005 | LaJoie | |
| 2006/0059373 A1 * | 3/2006 | Fayad et al. .................... | 713/192 |
| 2006/0179153 A1 * | 8/2006 | Lee et al. ....................... | 709/231 |
| 2007/0055872 A1 | 3/2007 | Soga | |
| 2007/0157209 A1 * | 7/2007 | Hashimoto et al. ........... | 718/104 |

FOREIGN PATENT DOCUMENTS

| | | |
|---|---|---|
| EP | 1837791 | 9/2007 |
| GB | 2336005 | 6/1999 |
| WO | WO2005/045789 | 5/2005 |

OTHER PUBLICATIONS

International Search Report PCT International application No. PCT/US2007/072338 dated Aug. 6, 2008.
EPC Communication European Application No. 07812418.7 dated Oct. 9, 2009.
Canadian Office Action dated Jul. 15, 2010 in Application No. 2,655,620.
European Office Action dated Sep. 9, 2010 in Application No. 07 812 418.7.

* cited by examiner

*Primary Examiner* — Patrice Winder
*Assistant Examiner* — Tauqir Hussain
(74) *Attorney, Agent, or Firm* — Merchant & Gould

(57) ABSTRACT

Included are systems and methods for providing access. At least one embodiment of a system includes a host configured to receive at least one tool for providing conditional access and a secure processor configured to receive conditional access logic. Some embodiments of the conditional access logic are configured to send at least one configuration message for configuring the at least one tool at the host component for operation with the received access logic.

19 Claims, 7 Drawing Sheets

RENEWABLE CONDITIONAL ACCESS

TECHNICAL FIELD

The present disclosure is related to renewable conditional access in a Set-top Terminal (STT). More specifically, the present disclosure is related to providing conditional access in any of a plurality of formats.

BACKGROUND

Users of a media network, such as a cable network have access to a plurality of programming options. Depending on the particular arrangement between the user and a network operator, the user may purchase various programming channels and options. A set-top terminal (STT) may be utilized to communicate with the media network to provide programming and options that the user has purchased. As the network operator generally tries to prevent unauthorized access to unpurchased channels and options, the STT may be configured with various authentication and/or encryption capabilities. As a nonlimiting example, many STTs may be configured with a secure processor, which may act as a physically secure environment for facilitating access to the purchased channels and options.

While historically, the secure processor has been configured with conditional access logic that is unchangeable subsequent to manufacture, many STTs are now being configured with one or more secure processors that are configured to receive conditional access logic updates and/or different conditional access logic from the logic currently stored. When such changes are made to the secure processor, however, other components, such as a host may also have logic that communicates with secure processor. As various components of the conditional access logic in the secure processor have changed, logic in the host may also change in order to communicate with the new conditional access logic. Since updating the host may involve knowledge of the new conditional access logic, as well as the capabilities of the particular system utilizing the new conditional access logic, many problems can arise in utilizing the new conditional access logic in this manner.

More specifically, at least one current approach includes host software and one or more secure processor client designed for a specific network and conditional access. This approach may reduce ability to produce a "generic" set-top box that can be configured to operate on an arbitrary network. One solution to this dilemma has been to divide set-top functionality between two separable modules. However, this solution can be more expensive because interface hardware and software are generally connected to these separable modules.

Generally speaking, there may be three components in a set-top terminal that may be network-specific: the code inside the secure processor, non-time-critical host code (which may be utilized for configuring network access, and/or other advanced features), and time-critical host code, which can be configured to communicate with the secure processor to obtain the control words necessary to decrypt content streams in real time. All of these elements may be part of the conditional access system (CAS) code on the host device. Downloading network-specific or CAS-specific host logic may not be desired. Since there are many different possible host platforms, each CAS provider would need to write code tailored to each specific host, which is in the general case intractable. One current solution involves an interpreter (such as a JAVA interpreter), and the network-specific portions can be written in JAVA or some other agreed-upon host-independent language. This solution may not be suitable for time-critical functions, however.

Thus, a heretofore unaddressed need exists in the industry to address the aforementioned deficiencies and inadequacies.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
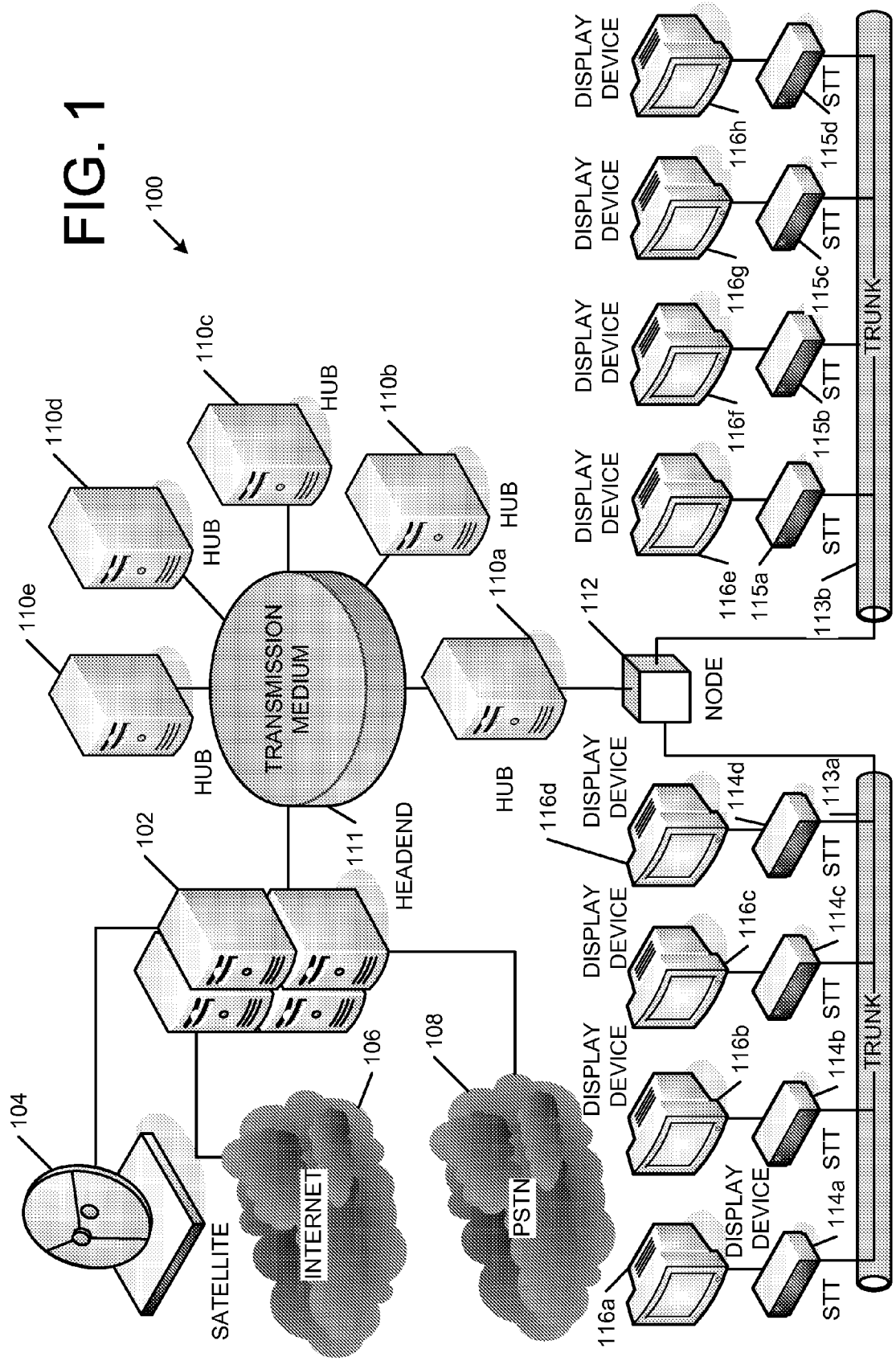
FIG. 1 is a network diagram illustrating a plurality of STTs in operation.

FIG. 1 is a network diagram illustrating a plurality of STTs in operation. More specifically, the components illustrated in FIG. 1 can generally be implemented as part of a cable television system (CTS) 100. FIG. 1 shows a view of a media network 100, which can take the form of a network system that can deliver video, audio, voice, and data services to set-top users. Although FIG. 1 depicts a high level view of a media network 100, one can appreciate that any of a plurality of different cable, satellite, Internet and/or other systems can tie together a plurality of components and/or networks into an integrated network so that STT users can receive content provided from anywhere in the world.

Media network 100 can be configured to provide programming signals as digitally formatted signals in addition to delivering analog programming signals. Further, media network 100 can also be configured to support one-way broadcast services as well as both one-way data services and two-way media and data services. The two-way operation of media network 100 can allow for user interactivity with services, such as Pay-Per-View programming, Near Video-On-Demand (NVOD) programming according to any of several NVOD implementation methods, View-On-Demand (VOD) programming (according to any of several known VOD implementation methods), and interactive applications, such as Internet connections and Interactive Media Guide (IMG) applications, among others.

Media network 100 may also be configured to provide interfaces, network control, transport control, session control, and servers to access content and services, and may be configured to distribute content and services to STT users from headend 102 via satellite 104a, PSTN 104b, and/or Internet 104c. As shown in FIG. 1, at least one embodiment of media network 100 includes a headend 102 and a plurality of hubs 110a-110e coupled to a transmission medium 111. The transmission medium 111 can include any configuration of networking logic for providing communication capabilities between components in media network 100. Additionally included in the nonlimiting example of FIG. 1 is a node 112 coupled to hub 110a. Coupled to the node 112 are trunks 113a and 113b. Trunks 113 can facilitate the communication of programming data to the plurality of digital set-top terminals (STTs) 114a-114d and a plurality of analog STTs 115a-115d. Display of the received data can be provided by display devices 116a-116h.

One can appreciate that, although a single headend 102 is illustrated in FIG. 1, media network 100 can include any number of headends 102. Similarly, other components may be added to media network 100 and/or removed from media network 100, depending on the desired functionality. Similarly, while media network 100 includes a plurality of hubs, nodes, and trunks, depending on the particular network infrastructure these (as well as other components illustrated in FIG. 1) are nonlimiting examples.

Figure 2:
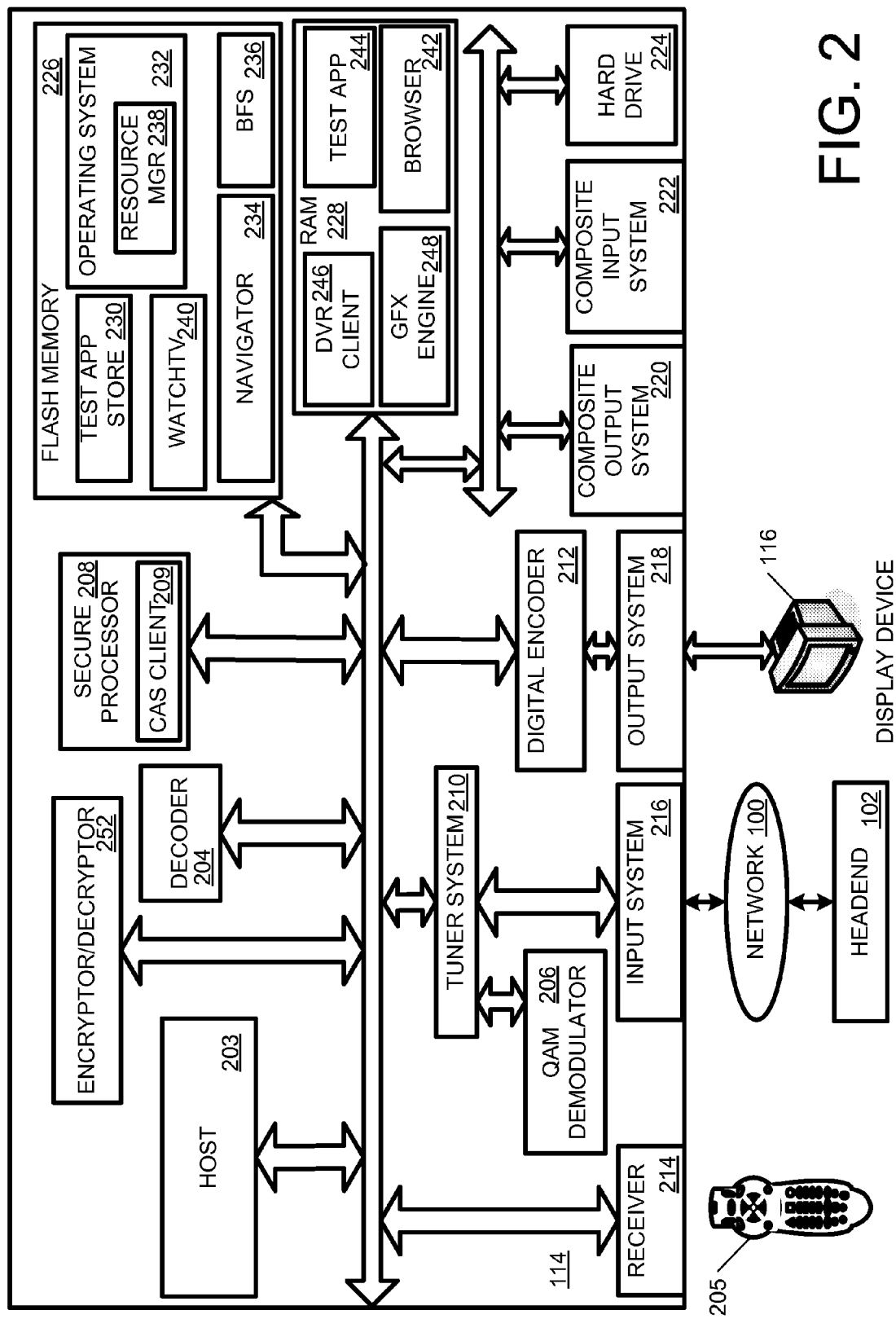
FIG. 2 is a functional block diagram illustrating exemplary components of a digital STT, similar to an STT from FIG. 1.

FIG. 2 is a functional block diagram illustrating exemplary components of a digital STT, similar to an STT from FIG. 1. More specifically, STT 114 includes an output system 218, which may be coupled to a display device 116, such as a television, computer monitor, etc. The output system 218 may be configured to receive data from a digital encoder 212. STT 114 additionally includes an input system 216, which can be configured to communicate with media network 100 and the headend 102. As discussed in more detail below, the input system 216 and the output system 218 may include one or more components such as an input port and an output port, respectively. Also included is a receiver 214 for receiving user commands via a remote control 205. STT 114 may also include a composite output system 220 and a composite input system 222. These input and output systems can be configured to facilitate communication of data between the STT 114 and other devices.

STT 114 may also include a data storage infrastructure, such as Random Access Memory (RAM) 228 (which may include Dynamic RAM (DRAM), Video RAM (VRAM), Static RAM (SRAM), and/or other components) and flash memory 226. RAM 228 may include one or more software programs including a Digital Video Recorder (DVR) client 246 for receiving and storing received programming data, a graphics engine 248, a test application 244 and a browser 242. Similarly, flash memory 226 can include test application store 230, a watchTV component 240, and an operating system 232, which may include a resource manager component 238. Some embodiments may also include a hard drive 224.

An encryptor/decryptor component 252 may also be included for facilitating encryption and/or decryption of signals within the STT 114. One should note that while encryptor/decryptor 252 is illustrated as a separate component within STT 114, this is a nonlimiting example, as one or more encryptors and/or decryptors may be associated with a transport processor (not shown), secure processor 208, and/or other component within STT 114.

As one of ordinary skill in the art will realize, while certain components of FIG. 2 are illustrated as being stored in flash memory and other components are illustrated as being stored in RAM, this is a nonlimiting example. Depending on the particular configuration, any of these components may reside in flash memory 226, RAM 228, and/or hard drive 224. Additionally, other storage devices (volatile and/or nonvolatile storage) may also be included in the STT 114 for storing and providing access to these and other components. Additionally, while a single secure processor 208 is depicted, in practice, one or more secure processors 208 may be included in an STT 114.

STT 114 may also include a host 203 (such as a host processor and/or other components) for performing one or more actions to facilitate conditional access of data received from media network 100. A decoder (not shown) may be included for decoding received data, and a Quadrature Amplitude Modulator (QAM) demodulator 206 for demodulating the received data. A secure processor 208, a tuner system 210, and a digital encoder 212 may also be included. Secure processor 208 may be viewed as a physically secure environment, such that physical access to the inner workings of secure processor are generally unobservable subsequent to manufacture, and may include logic, such as a Conditional Access System (CAS) client 209. CAS client 209 may be configured to provide a user with access to programming and/or options provided by media network 100.

One should note that while various components are illustrated in STT 114, this is a nonlimiting example. As one of ordinary skill in the art will realize, more or fewer components may be included to provide functionality for a particular configuration. Additionally, while the components of STT 114 are arranged in a particular manner, this is also a nonlimiting example, as other configurations are also considered.

Figure 3:
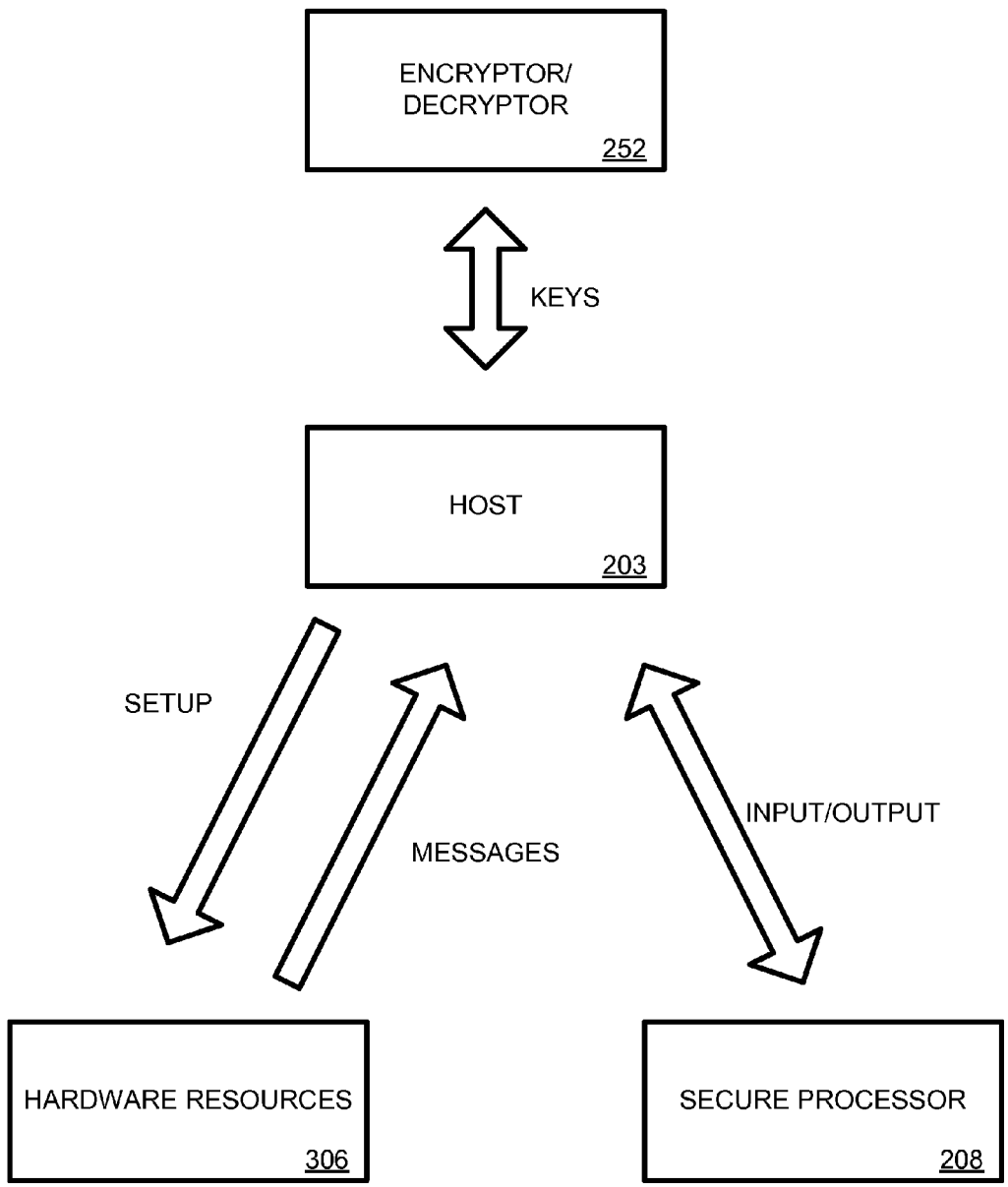
FIG. 3 is a block diagram illustrating an embodiment of communication between a host and a secure processor in a STT, such as the STT from FIG. 2.

FIG. 3 is a block diagram illustrating an embodiment of communication between a host and a secure processor in a STT, such as the STT from FIG. 2. More specifically, as illustrated in this nonlimiting example, a host 203 may reside in a transport processor (not shown) and/or elsewhere in STT 114. Generally speaking, host 203 includes logic for communicating with secure processor 208. This logic may be specifically configured to communicate with the particular version and type of CAS client 209 that may reside in secure processor 208. Additionally, the host 203 can also be configured to receive messages from and provide setup data to hardware resources 306. The host 203 may also communicate encryption/decryption keys with encryptor/decryptor 252.

As illustrated, the setup process in this particular configuration may include the host 203 sending data to hardware resources 306. As the secure processor in this nonlimiting example may be unchangeable, there is generally no software setup process between the host 203 and secure processor 208 because during manufacture, the host 203 was specifically designed to operate with secure processor 208 and logic included therein. During manufacture, the host can be configured to communicate with secure processor 208 and CAS client 209. As the CAS client does not change, there may be no desire to "setup" software residing on host 203 with secure processor 208.

Additionally, in many current implementations of STT 114, secure processor 208 and/or CAS client 209 may be configured for update and/or change. In many cases, the new logic can be downloaded from media network 100 and/or from other locations to the secure processor 208. However, in order to operate properly, many of these configurations also provide that host 203 also receive logic for communicating with the new logic received at secure processor 208. As the logic received at secure processor 208 may have a specific protocol, the logic at host 203 may be configured according to this specific protocol. While such a configuration can provide flexibility in the logic utilized by secure processor 208, specific host logic may be created for each new version of secure processor logic.

As also illustrated in FIG. 3, once host 203 completes setup with hardware resources 406, host 203 can receive messages from hardware resources 406 and send messages to secure processor 208. In such a configuration, secure processor 208 is implemented as a passive component (slave) to the active component (master) host 203. More specifically, in such a configuration, secure processor 208 sends data to host 203 in response to receiving a request from host 203. Secure processor 208 may be configured to otherwise remain passive.

One should note that, in at least one embodiment, the host 203 may be configured to communicate with the secure processor 208 at a low hardware level since the details of this level may not be network-specific. In addition, some of the commands sent from the host 208 to the secure processor 208 may be intrinsically network-nonspecific. As such one may expect the host 203 to understand these commands, without relying on downloaded modules. As a nonlimiting example, the commands used to download a new conditional access client to the secure processor 208 is likely not CA-specific. Likewise, in the context of the present disclosure, the commands that the host issues to learn how to adapt itself to the loaded conditional access client would likely also not be CAS-specific.

Figure 4:
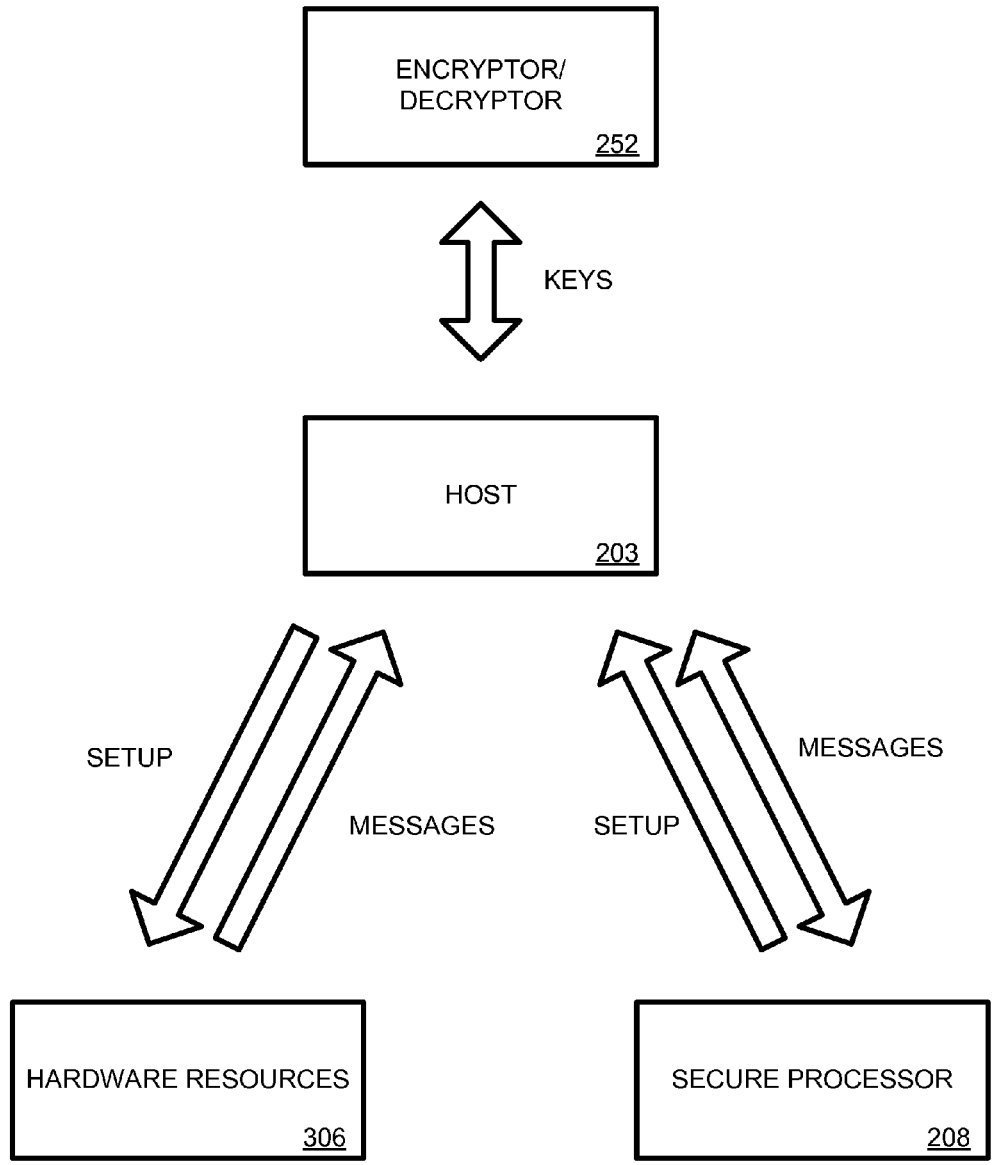
FIG. 4 is a block diagram illustrating an embodiment of communication between a host and a secure processor with an updateable conditional access system (CAS) client, similar to the diagram from FIG. 3.

FIG. 4 is a block diagram illustrating an embodiment of communication between a host and a secure processor with an updateable conditional access system (CAS) client, similar to the diagram from FIG. 3. As illustrated in this nonlimiting example, secure processor 208 may be configured to receive a downloaded CAS client 209, which can communicate with the host processor 203. As discussed in more detail below (e.g., FIG. 5), host 203 can include a plurality of generic tools, which can be configured by the CAS client 209 for performing host operations using resources that the CAS client 209 may not be able to access directly. These modules may be configured to perform actions on behalf of network-specific logic in the CAS client 209.

The subsequently received CAS client may include, among other things, parameters for configuring the generic tools received by the host 203. More specifically, in at least one embodiment, during (or after) manufacture, STT 114 may receive a CAS client 209 at secure processor 208. CAS client 209 may include one or more parameters for configuring any of a plurality of tools that may be located at host 203 (or otherwise on STT 114). During setup, the secure processor 208 can send one or more parameters for configuring the tools on host 203 for the specific CAS client 209 on secure processor 208. Upon completion of the setup process, secure processor 208 and host 203 may send and receive messages for providing conditional access for various programming and/or options to a user of STT 114. Additionally, as discussed with regard to FIG. 3, host 203 can send and receive keys from encryptor/decryptor 252, as well as receive messages from and perform setup functions with hardware resources 406.

One should note that while, in the configuration from FIG. 3, the secure processor 208 acts as a passive (slave) component, in the nonlimiting example of FIG. 4, secure processor 208 acts an active component (even though the hardware may still be configured as a passive device). More specifically, as illustrated in FIG. 4, secure processor 208 can be configured as a master component to instruct host 203 for adapting tools of the host 203 to match the secure processor-resident conditional access client.

Figure 5:
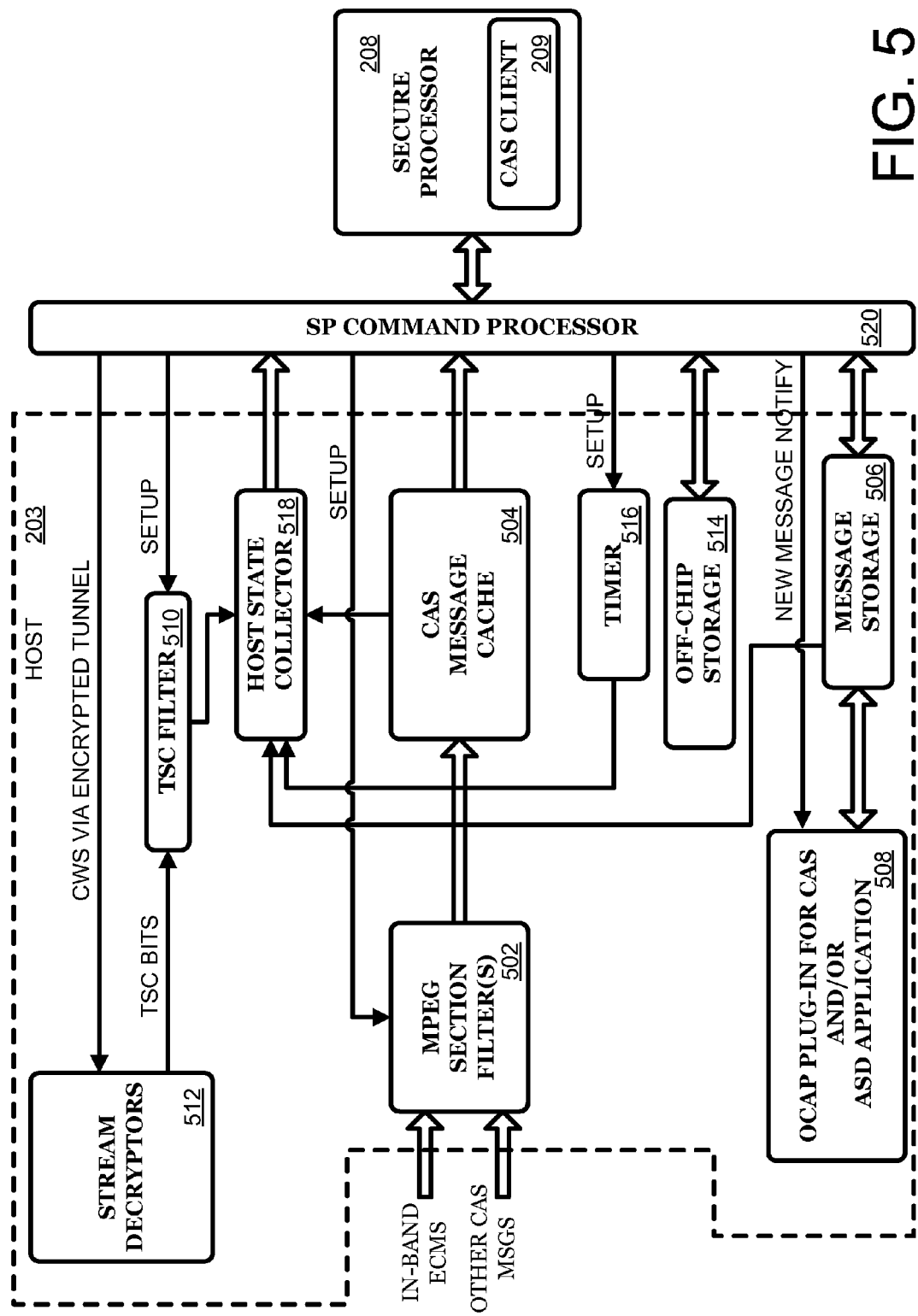
FIG. 5 is a functional block diagram illustrating an embodiment of a plurality of components with a secure processor, such as in the STT from FIG. 2.

FIG. 5 is a functional block diagram illustrating an embodiment of a plurality of tools with a CAS client in a secure processor, such as in the STT from FIG. 2. As illustrated in the nonlimiting example of FIG. 5, host 203 can be configured with any of a plurality of generic tools for facilitating conditional access as well as performing other functions. Additionally, as discussed above, host 203 can also be configured to receive one or more parameters from CAS client 209 for configuring the generic tools to operate with the CAS client 209 currently operating on secure processor 208.

Additionally, host 203 can include one or more MPEG section filters 502 that may be configured to receive in-band Entitlement Control Messages (ECM) and/or other conditional access messages. Upon receiving the ECMs and/or other conditional access messages, the MPEG section filter(s) 502 can determine which messages to pass to CAS message Cache 504. In operation, MPEG section filter(s) 502 can, upon receiving a message, determine the start of a message according to a an indication in the MPEG transport packet. The MPEG section filter(s) 502 can additionally utilize a mask and a compare value for determining whether the received message can pass to the CAS Message Cache 504. After determining the offset, the MPEG section filter(s) 502 can apply a mask to the received message. In applying the mask, the MPEG section filter(s) 502 can logically "and" the mask with data in the received massage. The MPEG section filter(s) 502 can then compare this result with a compare value. If the compare value matches the result, the message may pass to the CAS message cache 504. The MPEG section filter(s) 502 can additionally specify a message size, message rate, as well as other data.

As described above, during the setup process of the host 203 with a new CAS client 209, secure processor 208 sends a mask value, an offset value, a mode (pass on match versus drop on match, toggle filter mode, etc.), and/or a compare value to MPEG section filter(s) 502. The MPEG section filter (s) can then utilize this data (as described above) for filtering received messages according to the CAS client 209 being executed on secure processor 208.

Also included in the nonlimiting example of FIG. 5 is a CAS message cache 504. The CAS message cache 504 may be coupled to the MPEG section filter(s) 502 and may be configured to hold CAS messages received from the MPEG section filter(s) 502. The CAS message cache 504 may also be configured to record a time when a message is received, record the filter from which the message was received, and hold the received message in an addressed "slot" for delivery to the secure processor 208.

Additionally, the CAS message cache 504 can be configured to receive messages from CAS client 209. More specifically, depending on the particular configuration, the CAS client 209 can be configured to instruct the CAS message cache 504 to send at least one message stored on CAS message cache 504. The CAS client 209 can also instruct the CAS message cache 504 to delete a message stored on CAS message cache 504.

Also included in host 203 is an incoming message storage component 506. Incoming message storage component 506 can be configured to receive data from an Open Cable Application Platform (OCAP) plug-in for CAS and/or Authorized Service Domain (ASD) application 508. More specifically, OCAP data can be received from media network 100 for automatically updating an Interactive Programming Guide (IPG) for display to a user. More specifically, in at least one embodiment, a different IPG may be utilized depending on the particular media network 100 to which the STT 114 is coupled. As the STT 114 may not be configured to store an IPG for every possible media network 100, upon the STT 114 being coupled to media network 100, the media network 100 can download an IPG to the STT 114. Similarly, depending on the particular configuration, a new message for CAS client 209 may be received from media network 100, via OCAP plug-in 508, and stored at incoming host message storage 506. The CAS client 209 can access messages from message store 506 via Secure Processor (SP) command processor 520. Additionally, new message notify signal can be configured to signal to OCAP plug-in 508 that a message from message store 506 is waiting.

Also included in host 203 is a Transport Scrambling Control (TSC) bit filter 510. TSC filter 510 can be configured to receive the transport scrambling control bits from MPEG transport packets processed by the stream decryptors 512. More specifically, TSC filter can be configured to monitor the state of the TSC bits, record the time the bits change, and from those bits, determine whether a received stream of MPEG transport packets is encrypted. Control word(s) can also be sent from SP command processor 520 to stream decryptor 512 via an encrypted tunnel.

Additionally included in the nonlimiting example of FIG. 5 is an off-chip storage component 514. Off-chip storage component 514 can be configured as volatile and/or nonvolatile memory and can be configured to receive a Binary Large Object (BLOB), which can be accessed by CAS client 209. More specifically, off-chip storage component 514 can be configured to securely store data for access by the CAS client 209. As the CAS client 209 desires at least a portion of the data, the CAS client 209 can access off-chip storage components 514 for the desired data.

Host 203 in FIG. 5 also includes a timer 516. Timer 516 can be configured to for any of a plurality of timing tasks. Additionally, during setup, the CAS client 209 can configure the length of timer, period, granularity, and/or other features specific to this particular CAS client 209.

Also included in the nonlimiting example of FIG. 5 is a host state collector 518. In at least one embodiment, host state collector 518 can be configured to receive an indication of an event, and to send, in response to receipt of the indication, an abbreviated message to the secure processor 203 related to the event. More specifically, host state collector 518 can be coupled to TSC filter 510, CAS message cache 504, timer 516, message storage component 506, and/or other components. Upon occurrence of an event (such as the arrival of a message or the change of TSC bits), one or more components involved in the event can send a message regarding the details of that event to host state collector 518. Host state collector 518 can then determine the important portion(s) of the received message. Host state collector 518 can then send an abbreviated message indicating at least one important portion of the received message.

Upon receiving the abbreviated message from host state collector 518, secure processor 208 can determine whether and when to utilize information related to the event. If secure processor 208 determines that information related to the event is to be utilized, secure processor 208 can contact the relevant component(s) for access to the desired information. The host state collector utilizes abbreviated messages in order to save communications bandwidth between host 203 and CAS client 209.

Figure 6:
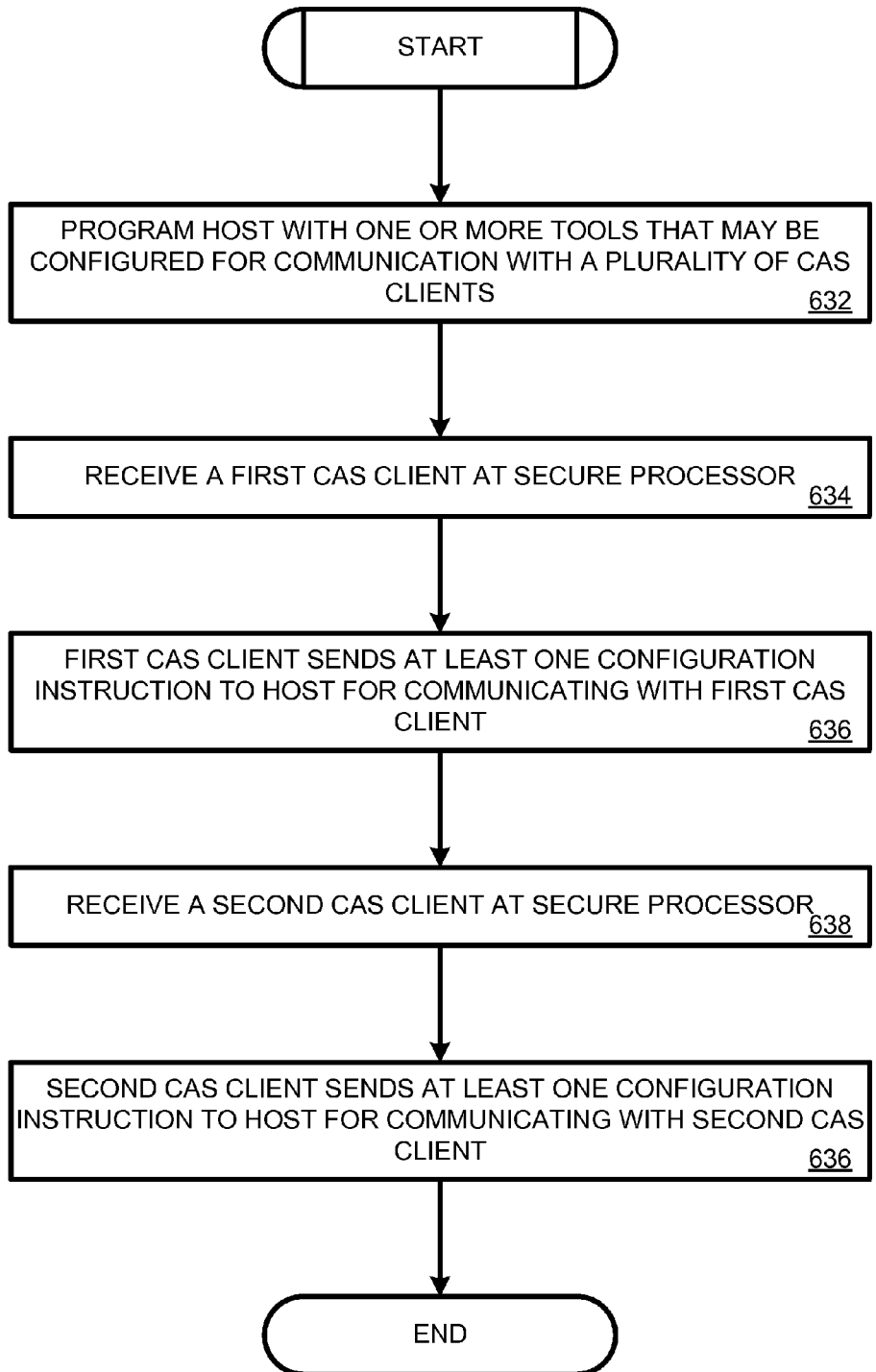
FIG. 6 is a flowchart illustrating an embodiment of a setup of a host and a secure processor with an updateable CAS client, such as in the STT from FIG. 2.

FIG. 6 is a flowchart illustrating an embodiment of a setup process for a host and a secure processor with an updateable CAS client, such as in the STT from FIG. 2. As illustrated in the nonlimiting example of FIG. 6, host 203 can be programmed with one or more generic tools that may be configured for communication with a plurality of CAS clients (block 632). Additionally, STT 114 can receive a first CAS client 209 at a secure processor 208 (block 634). First CAS client 209 can then send at least one configuration instruction to host 203 for communicating with this particular CAS client 209 (block 636). Secure processor 208 can then receive a second CAS client 209 (block 638). The second CAS client 209 can then send at least one configuration instruction to host 203 for communicating with second CAS client 209 (block 640). One should note that while in some embodiments the second CAS client 209 can be configured to replace the first CAS client 209, this is a nonlimiting example. More specifically, in at least one configuration a plurality of CAS clients 209 may coexist within STT 114.

Figure 7:
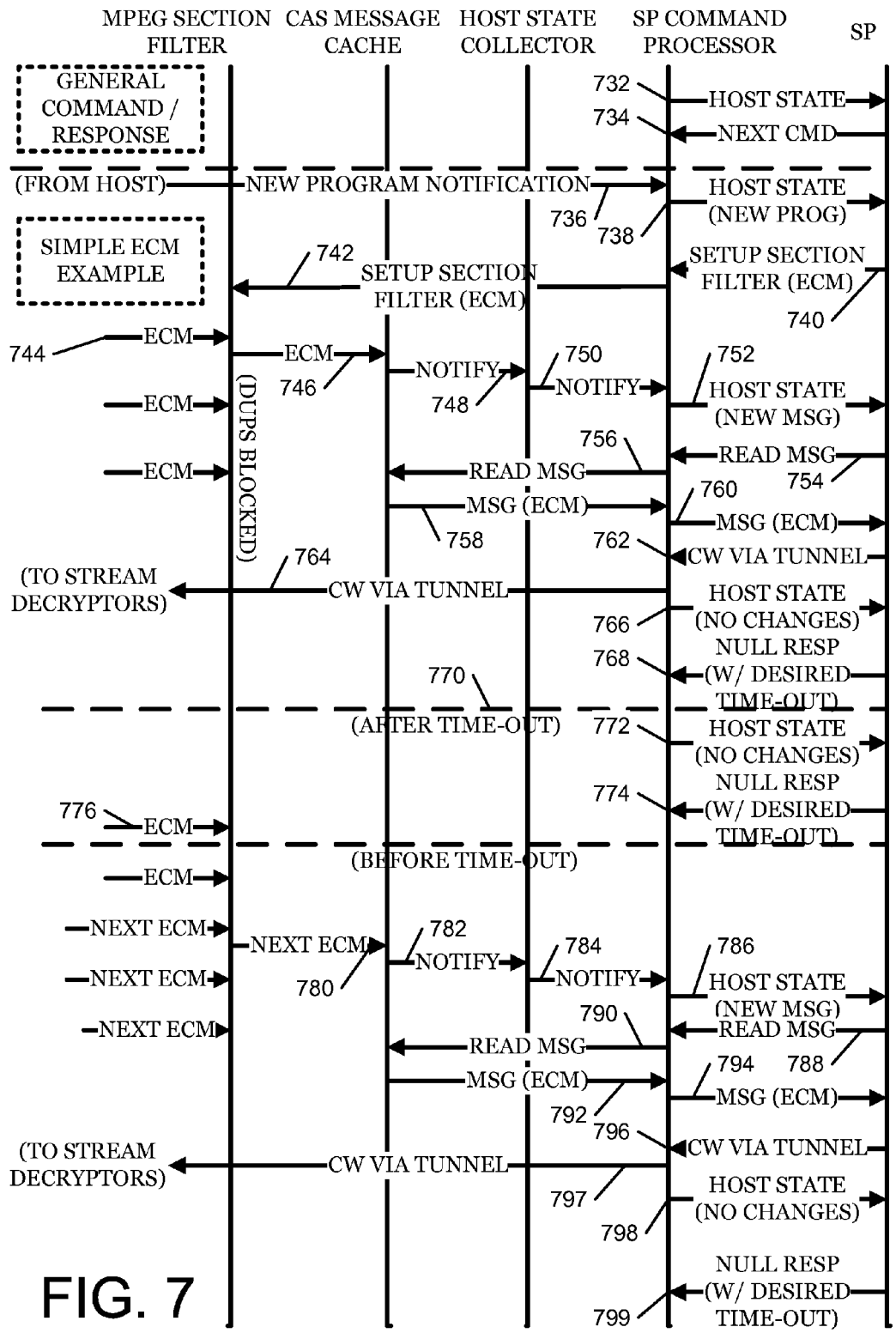
FIG. 7 is a sequence diagram illustrating an embodiment of actions taken with an updateable CAS client, such as the CAS client from FIG. 6.

FIG. 7 is a sequence diagram illustrating an embodiment of actions taken with an updateable CAS client, such as the CAS client from FIG. 6. More specifically, in at least one nonlimiting example of a general command and response, the Secure Processor (SP) command processor 520 can send a host state signal 732 to secure processor 208. Secure processor 208 can then send a next command signal 734. This sequence of sending a host state signal and next command signal can repeat any number of times.

In a nonlimiting example involving communication of an ECM, host can send a new program notification signal 736 to SP command processor 520. SP command processor 520 can receive this signal and send a host state (new program) signal 738 to secure processor 208. Secure processor 208 can then send a setup ECM section filter 740 to SP command processor 520. SP command processor 520 can then send a setup ECM section filter 742 to MPEG section filter 502. As discussed above, the setup signal for an MPEG section filter can include a mask, offset, compare value, and/or other data. Upon receiving the setup ECM section filter 742, the MPEG section filter 502 can receive one or more ECM signals 744. The MPEG section filter 502 can then filter out ECMs that do not match the criteria sent by the secure processor 208. MPEG section filter 502 can then send the matching ECM signal(s) 746 to CAS message cache 504. CAS message cache 504 can then send a notification signal 748 to host state collector indicating that an ECM was received. The notification signal 748 may also include a time of arrival, an address within CAS message cache 504, and/or other data. The host state collector 518 can then send an abbreviated notification 750, to SP command processor 520, indicating that an event has occurred with the CAS message cache 504. The SP command processor 520 can then send a host state (new message) 752 to secure processor 208 to indicate that an event has occurred. Secure processor 208 can then send a read message 754 to SP command processor 520, which can send a read message 756 to CAS message cache 504. CAS message cache 504 can then send a message including the ECM 758 to SP command processor 520, which can send a message 760 to secure processor 208.

One should note that the arrow 756 may indicate a step that is completed in any of a number of ways. More specifically, in at least one nonlimiting example, this might in fact be completed by passing a message from one module to another and receiving the data as a return message. In other configurations, this can be completed via a simple Application Programming Interface (API) call. Similar configurations can apply to arrows 790, 791, and/or 792.

Upon receiving the message including ECM 760, the secure processor 208 can send a control word (CW) via a tunnel 762 to SP command processor 520. SP command processor 520 can then send the control word via tunnel 764 to stream decryptors (e.g., encryptor/decryptor 252). SP command processor 520 can then send a host state signal 772 indicating no changes to secure processor 208. Secure processor 208 can respond with a null response with a desired time-out 768.

If no other events occur after the time-out has occurred 770, the SP command processor 520 can again send a host state signal 772 indicating that there are no changes. The secure processor 208 can then provide a null response (with desired time-out time) 774 to SP command processor 520. If, on the other hand, an ECM 776 is received at MPEG section filter 502 prior to the time-out, the MPEG section filter 502 can filter out undesired ECMs and send desired ECM(s) 780 to CAS message cache 504. CAS message cache 504 can then send an event notification 782 to host state collector 518, which can send an abbreviated notification to SP command processor 520. SP command processor can send a host state (new message) signal 786 to secure processor 208. Secure processor 208 can respond with a read message signal 788 to SP command processor 520. SP command processor 520 can send a read message signal 790 to CAS message cache 520, which can respond with a message 792 that includes an ECM to SP command processor 520. SP command processor 520 can send the message including ECM 794 to secure processor 208. The secure processor 208 can then send a control word via a tunnel 796 to SP command processor 520. SP command processor 520 can then send the control word via a tunnel 797 to stream decryptors. SP command processor 520 can then send a host state signal 798 indicating no changes since the last event. Secure processor 208 can then send a null response (with desired time-out) 799 to SP command processor. One should note that while FIG. 7 illustrates host state signals 766, 772, etc. are illustrated as originating from SP command processor 520, one should note that in at least one embodiment, one or more of these signals can originate from host state collector 518. Similarly, while FIG. 7 illustrates null response signals 768, 774, 799, etc. as terminating at SP command processor 520, this is also a nonlimiting example, as one or more of these signals may terminate at host state collector 518. Other configurations are also possible. As illustrated in this nonlimiting example, since the secure processor 208 may be configured to send data only upon receiving a request, the logic associated with the host 203 may be configured to periodically query the secure processor 208 for data the secure processor 208 might desire to send.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order or not at all, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:
1. A system for providing access, comprising:
a host configured with at least one generic tool for providing conditional access, wherein the host configured with the at least one generic tool for providing conditional access comprise the host configured to issue commands to learn to adapt to the at least one generic tool, the commands not being conditional access specific, wherein the host component includes at least one Moving Pictures Experts Group (MPEG) section filter, the at least one MPEG section filter being configured to filter at least one received message, wherein the at least one MPEG section filter being configured to filter the at least one received message comprises the at least one MPEG section filter being configured to, in response to a received offset, apply a mask to the at least one received message wherein the at least one MPEG section filter being configured to apply the mask comprises the at least one MPEG section filter being configured to:
logically "and" the mask with data in the at least one received message to produce a result,
compare the result with a compare value, and
pass the at least one received message to a conditional access system (CAS) message cache when the compare value matches the result, wherein the CAS message cache is configured to record a time when the received message is passed, and the CAS message cache is further configured to record the identification of the at least one MPEG section filter; and
a secure processor configured to receive conditional access logic, the conditional access logic configured to send at least one configuration message for configuring the at least one generic tool at the host for operation with the received conditional access logic, the secure processor further configured to:
receive a signal indicating no changes to the secure processor,
respond with a null response with a time-out value, and
if a plurality of entitlement control messages are received by the at least one MPEG section filter prior to the time-out, controlling the MPEG section filter to filter out undesired entitlement control messages and send desired entitlement control messages to the CAS message cache.

2. The system of claim 1, wherein the host component includes at least one host state collector configured to receive an event message related to an event, the host state collector further configured to send an abbreviated message related to the received event message to the secure processor.

3. The system of claim 2, wherein the secure processor is further configured to receive the abbreviated message, the secure processor further configured to send a request for data related to the event.

4. The system of claim 1, wherein the host includes stream decryptor configured to decrypt an encrypted stream based on received transport scrambling bits.

5. The system of claim 1, wherein the access logic is further configured to send at least one configuration message for configuring at least one of the following: a Transport Scrambling Control (TSC) filter, a Moving Picture Experts Group (MPEG) section filter, and a timer.

6. The system of claim 1, further comprising a command processor configured to facilitate communication between the secure processor and the host.

7. A method for configuring a set-top terminal (STT), comprising:
receiving, at a secure processor, first conditional access logic configured to configure tool logic in a host to communicate with the received conditional access logic;
sending, to the host, at least one configuration instruction for configuring the tool logic to communicate with the first conditional access logic, wherein sending the at least one configuration instruction for configuring the tool logic to communicate with the first conditional access logic comprises issuing commands in order to learn to adapt the tool to communicate with the first conditional access logic, the commands not being conditional access specific; and
filtering, by the host using at least one Moving Pictures Experts Group (MPEG) section filter, at least one received message, wherein filtering the at least one received message comprises, in response to a received offset, applying a mask to the at least one received message wherein applying the mask comprises:
logically "anding" the mask with data in the at least one received message to produce a result,
comparing the result with a compare value,
passing the at least one received message to a conditional access system (CAS) message cache when the compare value matches the result, wherein the CAS message cache is configured to record a time when the at least one received message is passed, and the CAS message cache is further configured to record the identification of the at least one MPEG section filter,
receiving a signal indicating no changes to the secure processor, responding with a null response with a time-out value, and
if a plurality of entitlement control messages are received by the at least one MPEG section filter prior to the time-out, controlling the MPEG section filter to filter out undesired entitlement control messages and send desired entitlement control messages to the CAS message cache.

8. The method of claim 7, further comprising receiving the tool logic at the host.

9. The method of claim 7, further comprising receiving the first conditional access logic from a headend.

10. The method of claim 7, further comprising receiving a second conditional access logic configured to replace the first conditional access logic.

11. The method of claim 7, further comprising receiving a second conditional access logic in addition to the first conditional access logic.

12. The method of claim 10, the second conditional access logic further configured to reconfigure the tool logic to communicate with the second conditional access logic.

13. A non-transitory computer readable storage medium for providing conditional access, comprising:
setup logic configured to send at least one configuration message for configuring the at least one tool at a host component;
operation logic configured to perform at least one operation with the configured at least one tool of the host component, wherein the operation logic configured to perform the at least one operation with the configured at least one tool of the host component comprises the operation logic configured to issue commands to the host component to allow the host component to adapt learn to the conditional access, the commands not being conditional access specific, wherein the operation logic includes at least one Moving Pictures Experts Group (MPEG) section filter, the at least one MPEG section filter being configured to filter at least one received message, wherein the at least one MPEG section filter being configured to filter the at least one received message comprises the at least one MPEG section filter being configured to, in response to a received offset, apply a mask to the at least one received message wherein the at least one MPEG section filter being configured to apply the mask comprises the at least one MPEG section filter being configured to:
logically "and" the mask with data in the at least one received message to produce a result,
compare the result with a compare value, and
pass the at least one received message to a conditional access system (CAS) message cache when the compare value matches the result, wherein the CAS message cache is configured to record a time when the at least one received message is passed, and the CAS message cache is further configured to record the identification of the at least one MPEG section filter; and
operation logic, further configured to:
receive a signal indicating no changes to the secure processor,
respond with a null response with a time-out value, and
if a plurality of entitlement control messages are received by the at least one MPEG section filter prior to the time-out, controlling the MPEG section filter to filter out undesired entitlement control messages and send desired entitlement control messages to the CAS message cache.

14. The non-transitory computer readable storage medium of claim 13, wherein the host component includes at least one host state collector configured to receive an event message related to an event, the host state collector further configured to send an abbreviated message related to the received event message to the secure processor.

15. The non-transitory computer readable storage medium of claim 13, wherein the operation logic is further configured to receive the abbreviated message, the secure processor further configured to send a request for data related to the event.

16. The non-transitory computer readable storage medium of claim 13, wherein the host includes a Transport Scrambling Control (TSC) filter configured to facilitate a determination of whether a received message is encrypted.

17. The system of claim 1, wherein the secure processor is configured to provide the host with a mask value corresponding the mask and the offset value.

18. The method of claim 7, further comprising providing, by the secure processor, the host with a mask value corresponding the mask and the offset value.

19. The non-transitory computer readable storage medium of claim 13, wherein the setup logic is configured to provide the operation logic with a mask value corresponding the mask and the offset value.

* * * * *